Feb. 3, 1959 W. KASTEN 2,872,044
FILTER ELEMENT SUPPORTING PLATE AND FERRULE ASSEMBLY
Filed June 22, 1955 2 Sheets-Sheet 1

INVENTOR.
WALTER KASTEN
BY Robert C. Smith
ATTORNEY

INVENTOR.
WALTER KASTEN
BY
*Robert C. Smith*
ATTORNEY

United States Patent Office 2,872,044
Patented Feb. 3, 1959

2,872,044

FILTER ELEMENT SUPPORTING PLATE AND FERRULE ASSEMBLY

Walter Kasten, Royal Oak, Mich., assignor to Bendix Aviation Corporation, South Bend, Ind., a corporation of Delaware Application June 22, 1955, Serial No. 517,335

5 Claims. (Cl. 210—323)

The present invention relates to apparatus for filtering or straining fluids and more particularly to a filter unit having multiple washer type filtering elements suspended from a mounting plate.

An object of this invention is to provide a simple and straightforward means for supporting washer type filter elements within a filter tank.

Another object of this invention is to provide an economical and easily manufactured filter element supporting plate and ferrule assembly.

A further object of this invention is to eliminate threaded connections between a filter element ferrule and a filter element supporting plate thereby removing any possibility for screw thread damage which would result in discarding of the plate with a very considerable loss in time required in transferring all of the elements to a new plate.

A further object of this invention is to eliminate threaded connections between a filter element ferrule and a filter element supporting plate thereby removing any possibility for screw thread damage which would result in leakage of contaminated fluid between the screw threads into the filtered fluid portion of the filter unit.

A still further object of this invention is to provide a ferrule assembly which can be quickly and easily assembled with a washer type filter element.

It is a still further object of this invention to provide a filter element supporting plate and ferrule assembly which may be easily adapted to existing installations of this type of filtering apparatus.

In the past, filter element supporting plates have presented a source of difficulty due to the large number of holes that must necessarily be drilled to accommodate the ferrule connected to each filter element. Since it is not uncommon to have hundreds of the filter elements attached to the plate, the drilling of a hole for each element presents a time and labor consuming problem, especially when considering that heretofore the element supporting plate has been of considerable thickness. Furthermore, the usual procedure is to form, in each hole, pipe threads which engage similar threads formed on the filter element ferrule that supports the filter element. Again, a considerable amount of time and labor must be expended to provide these threaded joints. Also, a serious disadvantage results from the use of such a threaded connection. Since a non-corrosive metal, such as aluminum, is very likely to be used for the element supporting plate and the ferrule, a possibility of cross-threading or freezing of one of the ferrules in the plate is very possible. If a single ferrule should accidentally become cross-threaded or frozen in the element plate, it necessitates removal of every filter element and ferrule attached to the plate with a subsequent discarding of the plate itself. It is very obvious that the elimination of such shortcomings would result in a much more desirable and useful filter element mounting arrangement than has been previously used. It is, accordingly, an object of this invention to provide a filter element supporting plate which may be formed by a stamping process with the attendant holes being formed by a punching process. Furthermore, a considerable amount of metal is saved since the applicant's element supporting plate is built up of much thinner metal than that previously used without sacrificing the necessary structural strength. The elimination of the threads as provided by the present invention will prolong the life of the filter element supporting plate and ferrule since the disc type filter elements must be replaced from time to time, necessitating the removal and replacing of the ferrules each time. The screw threads would eventually be caused to wear because of the assembling and reassembling of the parts, while at the most, the applicant's arrangement would require only a gasket to assure sealing of each ferrule with the element supporting plate regardless of the number of disassemblies.

Other objects and advantages will become apparent from the following description and accompanying drawings wherein.

Figure 1:
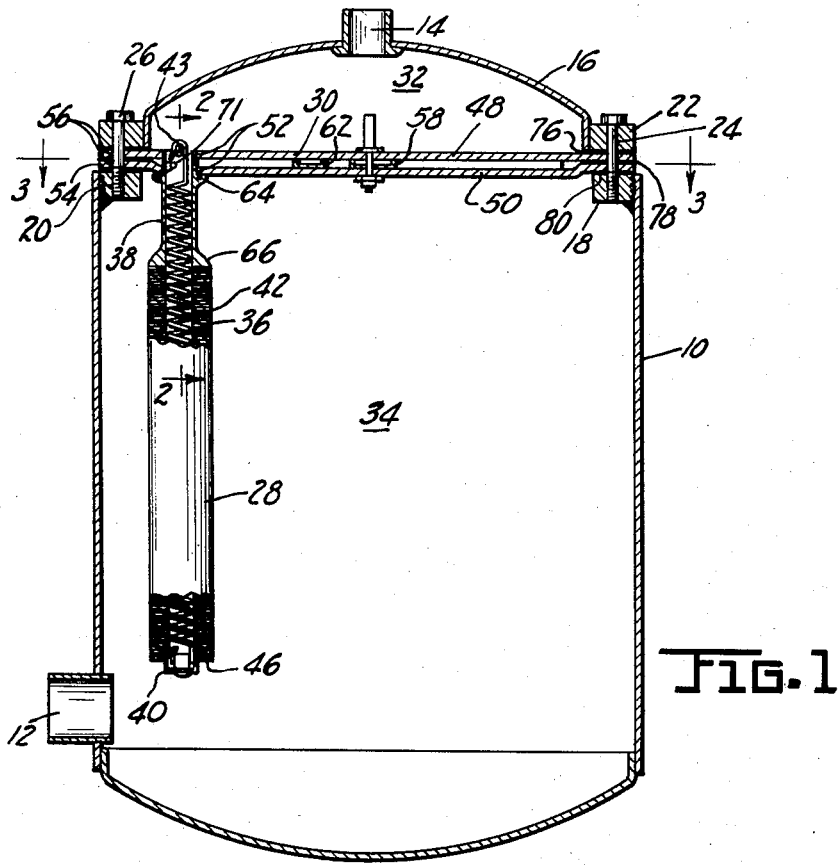
Figure 1 is a sectional view of the filter unit showing the assembled components and their relationship.

Referring to the drawings, numeral 10 designates a filter casing having an inlet passage 12, an outlet passage 14, and a cover 16. A flange 18 having radially threaded holes 20 is welded to the inner surface of the upper protion of casing 10. A similar flange 22 having radially spaced holes 24 is welded to the outer edge of cover 16. Fastening members 26 are threadedly engaged with flange 18 to hold cover 16 tightly in place. A plurality of washer type filter elements 28 are supported within casing 10 by a supporting member 30 which divedes the casing into upper and lower compartments 32 and 34, respectively. The filter elements 28 consist of thin washer-shaped elements 36 stacked adjacent to each other to form a filtering surface of a predetermined length. The washer-shaped elements 36 are normally made of paper impregnated with a resinous substance. The filter elements 28 are sealed at the upper end by a ferrule 38 and at the lower end by a cup-shaped spring retainer 40. The stack of washer-shaped elements 36 is held in place against ferrule 38 by a spring 42 secured at its upper end to a pin 43 attached to supporting member 30 and at its lower end to retainer 40 having a flange 46 for engaging the bottom of the stack and urging the stack of elements upwardly against ferrule 38.

The supporting member 30 consists of an upper and a lower division plate 48 and 50, respectively. The upper division plate 48 is a stamped metal member with a plurality of holes 52 punched therethrough for mounting filter elements 28. The pin 43 having a length slightly longer than the diameter of hole 52 extends transversely across the top of the hole 52 in the upper division plate 48. The ends of pin 43 are anchored to the plate by welding or any similar means. The lower division plate 50 is a stamped dish-shaped member having punched holes 52 which are in line axially with those in plate 48 when the plates are assembled. A flange 54 is formed around the outer portion of plate 50. Holes 56 formed in the outer portion of plates 48 and 50 are circumferentially spaced and radially located so as to be in line axially with holes 24 in flange 22 when the plates are secured in position. A plurality of reinforcing ribs 58 extend radially outward from the center of lower division plate 50 thereby dividing the plate into segments 60. The ribs 58 may be formed integrally with plate 50 or as separate U-shaped channel members welded to plate 50. Preferably the ribs are integrally formed when the plate 50 is stamped thus eliminating as many manufacturing steps as possible. A cup-shaped stiffening member 62 is radially located in each of the segments 60 and secured at its closed end to lower division plate 50.

The ferrule 38 is a tubular member having shoulders 64 and 66 formed thereon. A gasket 68 contained by a recess 70 in shoulder 64 abuts against lower division plate 50 to permit a sealed engagement between the plate and ferrule. Shoulder 66 having a diameter substantially equal to that of filter elements 28 is held in frictional contact with the top of the stack thereby providing a sealed engagement. The upper portion of ferrule 38 has two diametrically opposite slots 69 cut through the sidewalls for a purpose to be discussed later in connection with the assembly of the filter element. Near the top of the ferrule 38 and extending inwardly from the inner surface is a small cast lug 71 having an opening 72 therein to accommodate the top loop of spring 42. The purpose of the lug 71 will be discussed later in connection with the assembly of the filter element. A small hole 74 extends through the sidewall above the shoulder 64 of ferrule 38 to permit drainage of liquid from the space between the upper and lower division plates.

Figure 7:
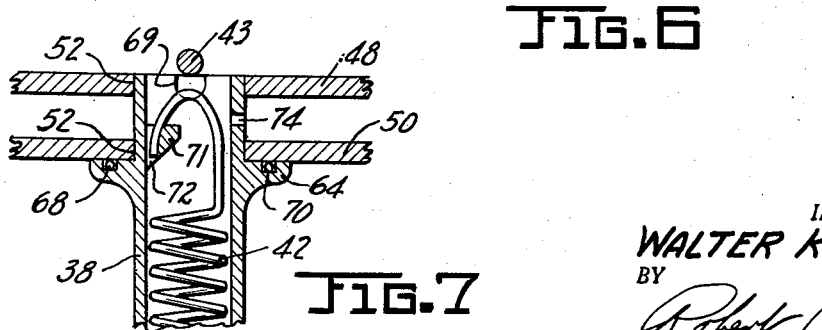
Figure 7 is a sectional view showing the ferrule as assembled to the filter element prior to attaching the assembly to the plate.

Prior to attaching the ferrules in place on the upper and lower division plates, each ferrule is assembled to a stack of washer-shaped elements 28 by means of spring 42 and retainer 40 as follows: A predetermined number of washer-shaped elements 36 are slipped over spring 42 attached at its lower end to retainer 40. The ferrule 38 is then slipped over spring 42 with shoulder 66 contacting the top of the stack. Spring 42 is then extended sufficiently to allow the top loop of spring 42 to be slipped into opening 72 in lug 71 thereby maintaining a tension force on the entire assembly (see Figure 7). The upper portion of ferrule 38 is then inserted upward through holes 52 in the upper and lower division plates 48 and 50. Spring 42 is then detached from lug 71 and extended sufficiently to allow the top loop of spring 42 to slip over pin 43. The spring 42 forces ferrule 38 upward permitting gasket 68 to be compressed between shoulder 64 and lower division plate 50 thus sealing the connection. Slots 69 are aligned with pin 43 to allow the top of ferrule 38 to extend above the bottom of pin 43 thereby insuring a sealed engagement of gasket 68 and the lower division plate. Upon assembly of all of the filter elements to the division plates, 48 and 50, in the above discussed fashion, the entire assembly is placed in casing 10 with gaskets 76, 78, and 80 being interposed between members 22 and 48, 48 and 50, and 50 and 18, respectively. The fastening members 26 are inserted through the cover 16, the division plates and gaskets, and threadedly engaged with holes 20 to permit a tightly sealed engagement of adjacent elements.

The ferrule 38 may be machined, die cast, or molded from plastic without affecting its desired function.

Figures 2, 4:
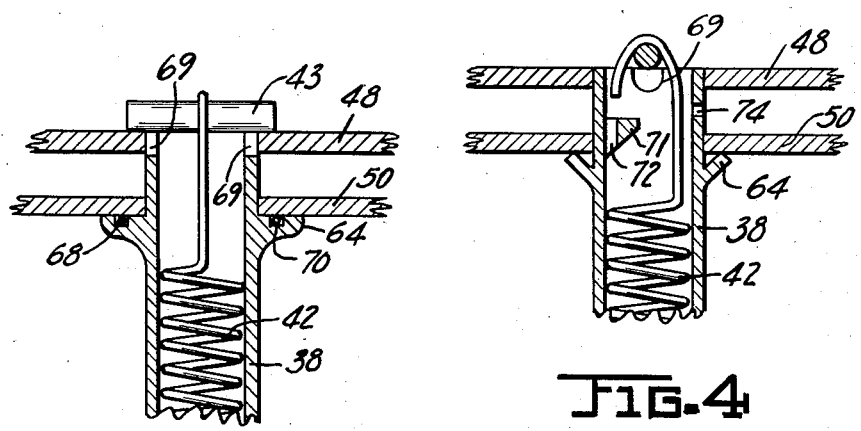
Figure 2 is an enlarged sectional view taken on line 2—2 of Figure 1.
Figure 4 is an enlarged sectional view of the ferrule showing a modification thereof.
Figure 3:
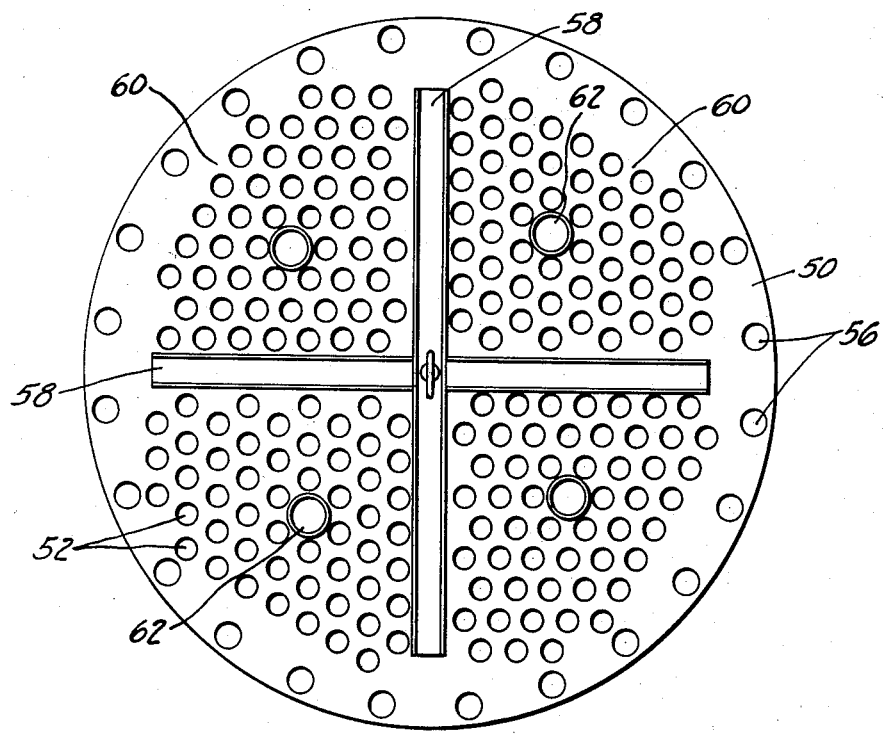
Figure 3 is a sectional view taken on line 3—3 of Figure 1.

Figure 4 shows a modification of the ferrule 38 wherein it is molded of hard plastic material. The shoulder 64 is formed with a knife edge facing upward which under the force of spring 40 will abut against lower division plate 50 to establish a seat thereon permitting a sealed engagement. It is obvious that gasket 68 may be eliminated in this case.

Figure 5:
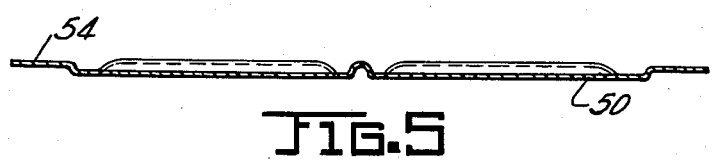
Figures 5 and 6 show sectional views of two modifications of the lower division plate wherein reinforcing beads are formed by upsetting the metal along diametrical portions of the plate.

Figure 5 is a sectional view of a modification of plate 50 wherein a plurality of rounded beads or ribs are formed along diametrical portions of the plate and extended upward therefrom. The ribs in this case are stamped integral to the plate.

Figure 6:

Figure 6 is a sectional view of another modification of plate 50 wherein a plurality of U-shaped channel members are formed along diametrical portions of the plate and extend downward therefrom. The channel members are formed integral to plate 50 by a stamping process.

In operation, contaminated liquid enters inlet 12 filling casing 10 to a level limited by lower division plate 50 thus surrounding filter elements 28 with liquid. Due to the pressure drop across the filter elements liquid is forced between adjacent washer-shaped filter elements 36 leaving any particles of solid matter on the outside thereof. The filtered liquid then flows up and out through ferrule 38 into the upper compartment 32 which receives liquid from all of the filter elements and discharges the filtered liquid through outlet 14. Any liquid trapped between the upper and lower division plates may drain through the hole 74 thus preventing excessive corrosion due to a trapped fuel and water mixture.

Although only one embodiment of the invention has been illustrated, various changes or arrangements may be made without departing from the spirit of the invention.

I claim:

1. In a filter casing having a plurality of washer type filter elements; supporting means for said filter elements comprising a mounting plate removably secured to said casing, a ferrule member removably securing said filter elements to said mounting plate, sealing means attached to said ferrule member and adapted to engage said mounting plate, retaining means operably attached to said filter elements and securely connected to said mounting plate, and resilient means attached to said retaining means for forcibly urging said ferrule member into contact with said mounting plate and said filter elements.

2. In a filtering device having an upper and lower chamber divided by a filter supporting plate, means for attaching a washer type filter element to said supporting plate, said means comprising a tubular member having a flanged formed thereon, sealing means attached to said flange and adapted to engage said supporting plate, retaining means attached to the bottom of said filter element and to said supporting plate, resilient means attachable to said retaining means for forcibly urging said tubular member into contact with said supporting plate, and a lug formed on the inner sidewall of said tubular member for maintaining said resilient means under tension prior to attaching said filter element to said supporting plate.

3. In a filtering device having an upper and lower chamber divided by a mounting plate which includes a plurality of openings therein, means for supporting a filter element to said mounting plate at each opening, said means comprising first retaining means attached to the mounting plate and second retaining means attached to the bottom of said filter element, resilient means connecting said first and second retaining means, and a tubular member located between one end of said filter element and said mounting plate, said tubular member having one end slidably disposed within one of said openings and a flange for sealing against said mounting plate, said resilient means forcibly urging said flange against said mounting plate.

4. In a filtering device having an upper and lower chamber divided by a mounting plate which includes a plurality of openings therein, means for supporting a washer type filter element to said mounting plate at each opening, said means comprising a tubular supporting member having a flange formed thereon, a lug extending inwardly from the inner sidewall of said tubular member near the top thereof, sealing means disposed in an annular recess in said flange and adapted to contact said mounting plate, a pin positioned across each of said openings in said mounting plate, retaining means adjacent the bottom of said filter element, and resilient means attached to said retaining means and to said pin for forcibly urging said flange against said mounting plate, said resilient means being connectable to said lug for maintaining tension therein prior to attachment to said pin.

5. In a filtering device having an upper and lower chamber divided by a mounting plate, means for supporting a filter element to said mounting plate, said means comprising a ferrule, sealing means attached to said ferrule and adapted to engage said mounting plate, retaining means attached to said filter element and to said mounting plate, and resilient means attached to said retaining means for forcibly urging said ferrule member into contact with said mounting plate and said filter element.

References Cited in the file of this patent

UNITED STATES PATENTS

| | | |
|---|---|---|
| 1,294,018 | Zahm et al. | Feb. 11, 1919 |
| 2,333,609 | Widmann | Nov. 2, 1943 |
| 2,523,793 | Vance | Sept. 26, 1950 |
| 2,717,082 | McCann | Sept. 6, 1955 |